(12) United States Patent
Bae et al.

(10) Patent No.: US 10,649,286 B2
(45) Date of Patent: May 12, 2020

(54) LIQUID CRYSTAL DISPLAY DEVICE

(71) Applicant: Samsung Display Co., Ltd., Yongin-Si, Gyeonggi-Do (KR)

(72) Inventors: Kwang Soo Bae, Suwon-si (KR); Jung Suk Bang, Seoul (KR); Min Jeong Oh, Gimpo-si (KR); Bo Ram Lee, Seongnam-si (KR); Young Je Cho, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/137,612

(22) Filed: Sep. 21, 2018

(65) Prior Publication Data

US 2019/0146284 A1    May 16, 2019

(30) Foreign Application Priority Data

Nov. 16, 2017  (KR) .................. 10-2017-0153178
Sep. 14, 2018  (KR) .................. 10-2018-0110474

(51) Int. Cl.
*G02F 1/1343*    (2006.01)
*G02F 1/1362*    (2006.01)
*G02F 1/1337*    (2006.01)

(52) U.S. Cl.
CPC .. *G02F 1/134309* (2013.01); *G02F 1/133707* (2013.01); *G02F 1/133753* (2013.01);
(Continued)

(58) Field of Classification Search
CPC ......... G02F 1/134309; G02F 1/133707; G02F 1/133753; G02F 1/136286; G02F 2001/133757; G02F 2001/133742; G02F 2001/134345; G02F 2201/122; G02F 2201/123; G02F 1/1343; G02F 1/13439; G02F 1/155; G02F 1/1393; G02F 1/1395; G02F 1/136; G02F 1/218; G02F 1/134363; G02F 1/134327; G02F 1/134336; G02F 1/0316; G02F 2001/134318; G02F 2001/134372; G02F 2001/134381; G02F 2001/1357; G02F 2001/136218; G02F 2001/136295; G02F 2001/1552;
(Continued)

(56) References Cited

U.S. PATENT DOCUMENTS

2007/0159585 A1* 7/2007 Yoshida ............ G02F 1/134363
                                                          349/130
2011/0013129 A1* 1/2011 Jeong ................ G02F 1/133707
                                                          349/141

(Continued)

*Primary Examiner* — Shan Liu
(74) *Attorney, Agent, or Firm* — Innovation Counsel LLP

(57) ABSTRACT

A liquid crystal display (LCD) device comprising: a substrate on which an active area that transmits light therethrough is defined; and a pixel electrode disposed on the substrate, wherein the pixel electrode includes a first stem electrode, which extends along a first direction, a second stem electrode, which extends along a second direction that is perpendicular to the first direction and intersects the first stem electrode to be divided into two halves by the first stem electrode, a third stem electrode, which extends along the second direction and is connected to the first stem electrode to be divided into two halves by an end of the first stem electrode, and a plurality of branch electrodes, which extend from the first through third stem electrodes.

14 Claims, 10 Drawing Sheets

(52) U.S. Cl.
CPC ............... *G02F 1/136286* (2013.01); *G02F 2001/133742* (2013.01); *G02F 2001/133757* (2013.01); *G02F 2001/134345* (2013.01); *G02F 2201/122* (2013.01); *G02F 2201/123* (2013.01)

(58) Field of Classification Search
CPC ..... G02F 2001/1555; G02F 2001/1557; G02F 2001/13629; G02F 2201/12; G02F 2201/121; G02F 2201/124; G02F 2201/14; G02F 2202/10; G02F 1/3775; G02F 2001/13787; G02F 2001/3548; H01L 27/124; H01L 27/3276; H01L 27/3297; H01L 27/3279; H01L 27/329; H01L 23/49534; H01L 2933/0016; G09G 2300/0421; G09G 2300/0426; G09G 2300/0439; G09G 3/3659
USPC .......................................... 349/129, 139–148
See application file for complete search history.

(56) References Cited

U.S. PATENT DOCUMENTS

2017/0017128 A1* 1/2017 No ................... G02F 1/134336
2017/0153517 A1   6/2017 Shin et al.
2018/0107040 A1* 4/2018 Yeh .................. G02F 1/133707

* cited by examiner

LIQUID CRYSTAL DISPLAY DEVICE

This application claims priority from and the benefit of Korean Patent Application No. 10-2017-0153178, filed on Nov. 16, 2017 and Korean Patent Application No. 10-2018-0110474, filed on Sep. 14, 2018 in the Korean Intellectual Property Office, which are hereby incorporated by reference for all purposes as if fully set forth herein.

BACKGROUND

1. Field

The present disclosure relates to a liquid crystal display (LCD) device.

2. Description of the Related Art

A liquid crystal display (LCD) device includes two substrates where field-generating electrodes such as pixel electrodes and a common electrode are formed and a liquid crystal layer which is injected between the two substrates. The LCD device generates an electric field in the liquid crystal layer by applying voltages to the field-generating electrodes so as to determine the orientation of liquid crystal molecules in the liquid crystal layer, and displays an image by controlling the polarization of light incident thereupon using the electric field.

A vertical alignment (VA)-mode LCD device has been developed in which the long axes of liquid crystal molecules are aligned perpendicularly to upper and lower substrates in the absence of an electric field.

The VA-mode LCD device may suffer from poorer lateral visibility than its front visibility. Specifically, the VA-mode LCD device may appear brighter when viewed on the sides thereof than when viewed at the front thereof, and as the difference between the brightness of the VA-mode LCD device as viewed at the front of the VA-mode LCD device and the brightness of the VA-mode LCD device as viewed on the sides of the VA-mode LCD device increases, the visibility of the VA-mode LCD device may gradually deteriorate.

Thus, a structure capable of improving visibility by minimizing the difference between the brightness of an LCD device as viewed at the front of the LCD device and the brightness of the LCD device as viewed on the sides of the LCD device is needed.

SUMMARY

Exemplary embodiments of the present disclosure provide a liquid crystal display with improved visibility.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, there is provided a liquid crystal display (LCD) device comprising: a substrate on which an active area that transmits light therethrough is defined; and a pixel electrode disposed on the substrate, wherein the pixel electrode includes a first stem electrode, which extends along a first direction, a second stem electrode, which extends along a second direction that is perpendicular to the first direction and intersects the first stem electrode to be divided into two halves by the first stem electrode, a third stem electrode, which extends along the second direction and is connected to the first stem electrode to be divided into two halves by an end of the first stem electrode, and a plurality of branch electrodes, which extend from the first through third stem electrodes.

According to an exemplary embodiment of the present disclosure, there is provided an LCD device comprising: a substrate on which an active area that transmits light therethrough is defined; and a pixel electrode disposed on the substrate, wherein the active area includes a first domain area disposed in a first row and a second column, a second domain area disposed in a second row and the second column, a third domain area disposed in the first row and a first column, a fourth domain area disposed in the first row and a third column, a fifth domain area disposed in the second row and the first column, and a sixth domain area disposed in the second row and the third column, and the pixel electrode includes a first stem electrode, which is disposed along the boundaries between the first and second domain areas, between the third and fifth domain areas, and between the fourth and sixth domain areas, a second stem electrode, which is disposed along the boundaries between the first and third domain areas and between the second and fifth domain areas, a third stem electrode, which is disposed along lateral sides of the fourth and sixth domain areas that are distant from the second stem electrode, and a plurality of branch electrodes, which extend from the first through third stem electrodes.

According to the aforementioned and other exemplary embodiments of the present disclosure, a liquid crystal display with improved visibility can be provided.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
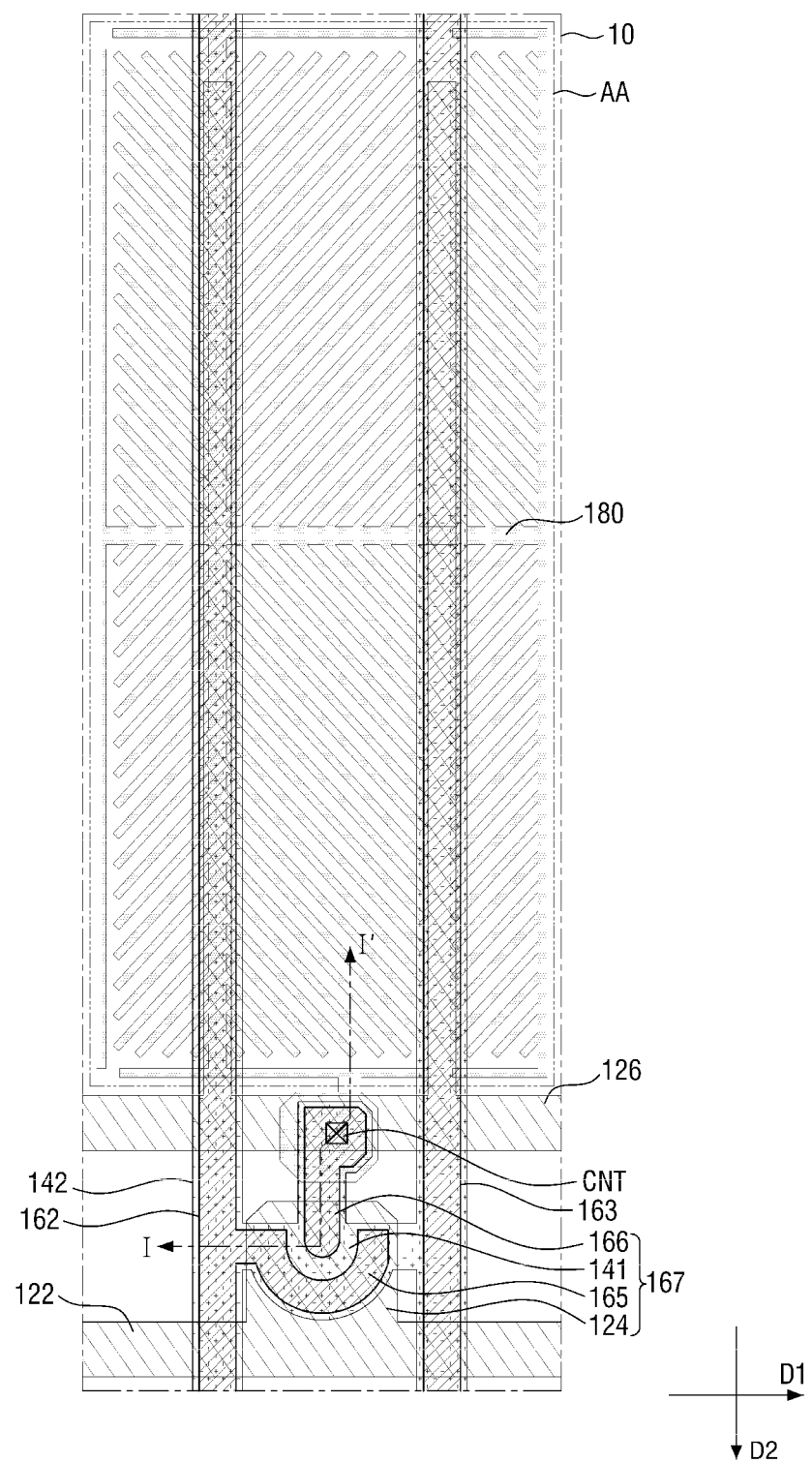
FIG. 1 is a layout view of a pixel of a liquid crystal display (LCD) device according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

Figure 2:
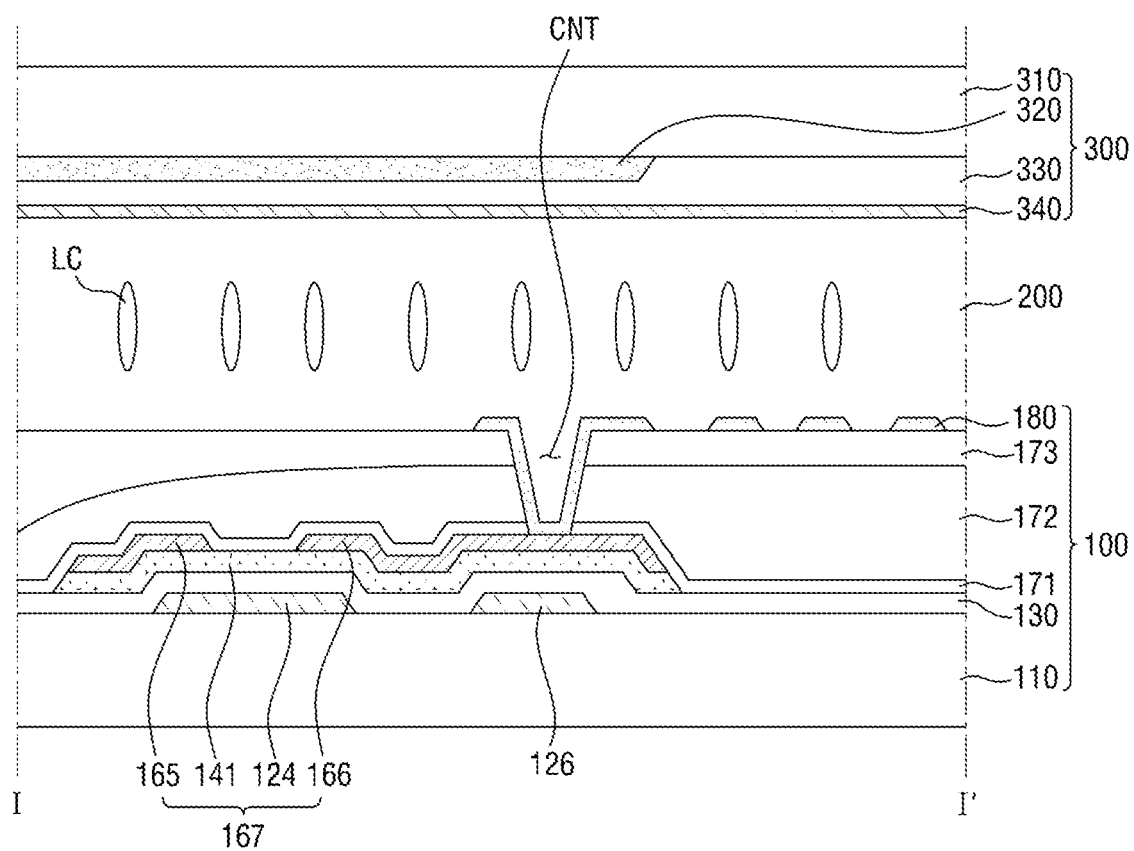
FIG. 2 is a cross-sectional view taken along line I-I' of FIG. 1.
Figure 3:
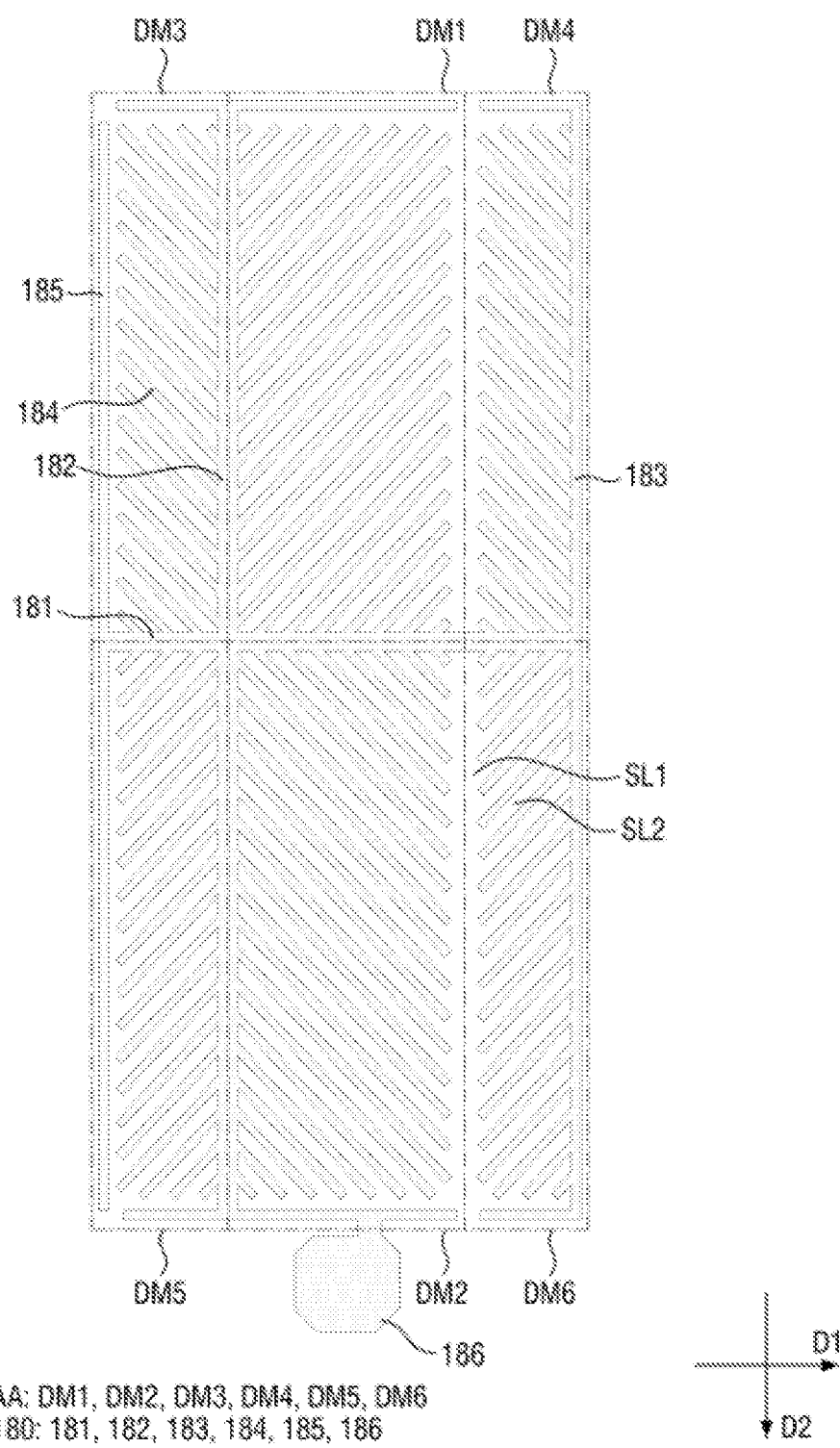
FIG. 3 is a layout view of a pixel electrode of the pixel of FIG. 1.
Figure 4:
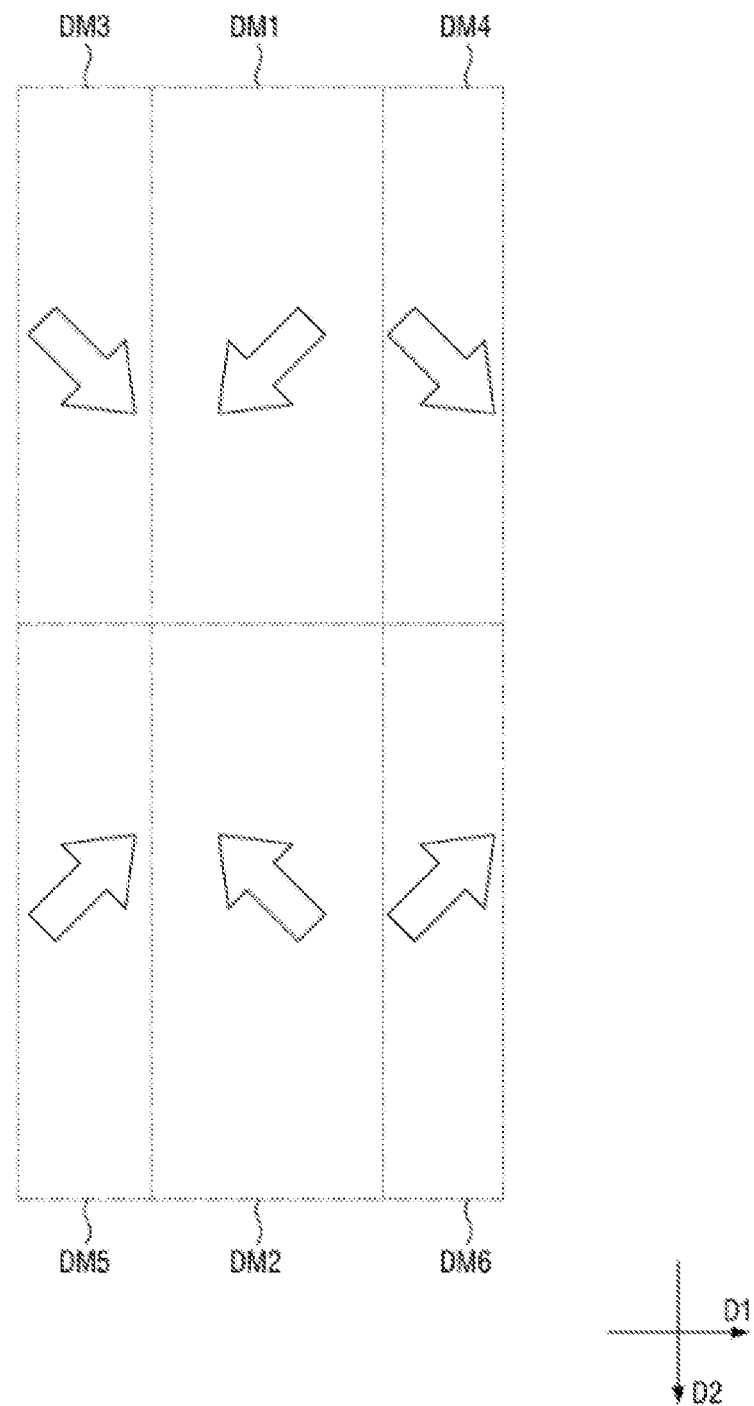
FIG. 4 is a schematic view showing directions in which liquid crystal molecules are tilted in an active area of the pixel of FIG. 1.

FIG. 1 is a layout view of a pixel of a liquid crystal display (LCD) device according to an exemplary embodiment of the present disclosure, FIG. 2 is a cross-sectional view taken along line I-I' of FIG. 1, FIG. 3 is a layout view of a pixel electrode of the pixel of FIG. 1, and FIG. 4 is a schematic view showing directions in which liquid crystal molecules are tilted in an active area of the pixel of FIG. 1.

Referring to FIGS. 1 through 4, the LCD device according to an exemplary embodiment of the present disclosure includes a first display substrate 100, a second display substrate 300, and a liquid crystal layer 200. The LCD device according to an exemplary embodiment of the present disclosure may further include a pair of polarizers (not illustrated), which are attached on the outer surfaces of the first and second display substrates 100 and 300.

A switching element for driving liquid crystal molecules LC included in the liquid crystal layer 200, for example, a thin-film transistor (TFT) 167, is provided in the first display substrate 100. The second display substrate 300 is a counter substrate disposed to face the first display substrate 100.

The liquid crystal layer 200 may be interposed between the first and second display substrates 100 and 300, and may include the liquid crystal molecules LC, which have dielectric anisotropy. In response to an electric field being applied between the first and second display substrates 100 and 300, the liquid crystal molecules LC may be rotated in a particular direction between the first and second display substrates 100 and 300 so as to allow or block the transmission of light through the liquid crystal layer 200. As used herein, the term "rotation of the liquid crystal molecules LC" not only means that the liquid crystal molecules LC are actually rotated, but also means that the alignment of the liquid crystal molecules LC is changed due to an electric field.

The LCD device according to an exemplary embodiment of the present disclosure includes more than one pixel 10, which is arranged in a matrix. The gray level of the pixel 10 may be independently controllable. The pixel 10 may be a basic unit for displaying a particular color. The pixel 10 includes an active area AA, which controls the gray level of the pixel 10 by controlling the transmittance of light incident thereupon from the bottom of the first display substrate 100.

The first display substrate 100 will hereinafter be described.

The first display substrate 100 includes a first base substrate 110. The first base substrate 110 may be a transparent insulating substrate. For example, the first base substrate 110 may be a glass substrate, a quartz substrate, or a transparent resin substrate.

In some exemplary embodiments, the first base substrate 110 may be curved along a particular direction. In some other exemplary embodiments, the first base substrate 110 may have flexibility. That is, the first base substrate 110 may be deformable through rolling, folding, or bending.

A gate line 122, a gate electrode 124, and a sustain line 126 are disposed on the first base substrate 110.

The gate line 122 transmits a gate voltage, which controls the TFT 167. The gate line 122 may extend in a first direction D1.

The first direction D1, which is perpendicular to a second direction D2, may be a direction parallel to one side of the first base substrate 110 on a plane where the first base substrate 110 is disposed, and may be defined as a direction indicated by an arbitrary straight line extending from the left to the right of FIG. 1. The second direction D2 may be defined as a direction indicated by an arbitrary straight line extending from the top to the bottom of FIG. 1.

The gate voltage may be provided by an external source and may have a variable level. The turning on or off of the TFT 167 may be controlled by the level of the gate voltage.

The gate electrode 124 may be formed to protrude from the gate line 122 and may be physically connected to the gate line 122. The gate electrode 124 may be an element of the TFT 167, which will be described later.

The sustain line 126 may be disposed between the gate line 122 and another gate line 122. The sustain line 126 may substantially extend in the first direction D1 and may have a portion extending along a side of the active area AA. The sustain line 126 may be disposed to adjacent to a side of a pixel electrode 180, which will be described later, and a predetermined capacitance may be formed between the pixel electrode 180 and the sustain line 126. Accordingly, a sudden drop in the voltage provided to the pixel electrode 180 can be prevented. The sustain line 126 may not be provided in a case where a drop in the voltage provided to the pixel electrode 180 is tolerable or insignificant and thus does not adversely affect the display quality of the LCD device according to an exemplary embodiment of the present disclosure, even in the absence of the sustain line 126.

The gate line 122, the gate electrode 124, and the sustain line 126 may be formed of the same material. For example, the gate line 122, the gate electrode 124, and the sustain line 126 may comprise aluminum (Al), an Al-based metal such as an Al alloy, silver (Ag), an Ag-based metal such as an Ag alloy, copper (Cu), a Cu-based metal such as a Cu alloy, molybdenum (Mo), a Mo-based metal such as a Mo alloy, chromium (Cr), tantalum (Ta), or titanium (Ti). The gate line 122, the gate electrode 124, and the sustain line 126 may have a single-layer structure or may have a multilayer structure including two conductive films having different physical properties.

A gate insulating layer 130 is disposed on the gate line 122, the gate electrode 124, and the sustain line 126. The gate insulating layer 130 may be formed of an insulating material. For example, the gate insulating layer 130 may be formed of silicon nitride or silicon oxide. The gate insulating layer 130 may have a single-layer structure or may have a multilayer structure including two insulating films having different physical properties.

First and second semiconductor patterns 141 and 142 are disposed on the gate insulating layer 130.

The first semiconductor pattern 141 may at least partially overlap with the gate electrode 124. A channel that electrically connects a source electrode 165 and a drain electrode 166, which will both be described later, may be formed in the first semiconductor pattern 141.

Although not specifically illustrated, in some exemplary embodiments, ohmic contact members may be additionally provided on the first semiconductor pattern 141. The ohmic contact members may be formed of silicide or n+ hydrogenated amorphous silicon doped with a high concentration of n-type impurities. The ohmic contact members may be disposed in a pair on the first semiconductor pattern 141. The ohmic contact members, which are disposed between the source electrode 165, the drain electrode 166, and the first semiconductor pattern 141, may enable the source electrode 165, the drain electrode 166, and the first semiconductor pattern 141 to have ohmic contact properties. In a case where the first semiconductor pattern 141 comprises an oxide semiconductor, the ohmic contact members may not be provided.

The second semiconductor pattern 142 is formed to overlap with a first data line 162, a second data line 163, the source electrode 165, and the drain electrode 166, which will all be described later. Since the second semiconductor pattern 142 is formed together with the first data line 162, the second data line 163, the source electrode 165, and the drain electrode 166 through a single mask process, the second semiconductor pattern 142 can be formed to overlap with the first data line 162, the second data line 163, the source electrode 165, and the drain electrode 166.

The first and second semiconductor patterns 141 and 142 may be formed of amorphous silicon, polycrystalline silicon, or an oxide semiconductor.

The first data line 162, the second data line 163, the source electrode 165, and the drain electrode 166 are disposed on the first semiconductor pattern 141, the second semiconductor pattern 142, and the gate insulating layer 130.

The first and second data lines 162 and 163 may extend in the second direction D2 and may intersect the gate line 122. The first and second data lines 162 and 163 may be insulated from the gate line 122 and the gate electrode 124 by the gate insulating layer 130.

The first data line 162 may provide a data voltage to the source electrode 165 of the pixel 10 of FIG. 1. Accordingly, the source electrode 165 can be electrically connected to the first data line 162. The second data line 163 may provide the data voltage to a source electrode of a pixel adjacent to the pixel 10 of FIG. 1 in the second direction D2. Here, the data voltage provided by the first and second data lines 162 and 163 may be provided from an external source and may have a variable level. The gray level of the pixel 10 may vary depending on the level of the data voltage provided by the first and second data lines 162 and 163.

The first and second data lines 162 and 163 may extend in parallel to each other along the second direction D2 and may be spaced apart from each other.

This is highly effective for a large-sized LCD device or for a case where the first semiconductor pattern 141 is formed of a semiconductor material with low mobility.

Even though the first and second data lines 162 and 163 are disposed to cross the active area AA, a decrease in the transmissivity of the pixel 10 can be minimized by arranging the first data line 162 to overlap with a second stem electrode 182, which will be described later, and arranging the second data line 163 to overlap with a first slit SL1, which will also be described later.

The source electrode 165 may be branched off from the first and second data lines 162 and 163 and may at least partially overlap with the gate electrode 124.

As illustrated in FIG. 1, the source electrode 165 may be a predetermined distance apart from the drain electrode 166 and may be formed in a U shape to surround the drain electrode 166, but the present disclosure is not limited thereto. That is, alternatively, the source electrode 165 and the drain electrode 166 may be formed as bars that are a predetermined distance apart from each other and extend in parallel to each other. That is, the source electrode 165 and the drain electrode 166 can be formed in various shapes as long as they can face each other with a predetermined gap therebetween.

The first data line 162, the second data line 163, the source electrode 165, and the drain electrode 166 may be formed of the same material. For example, the first data line 162, the second data line 163, the source electrode 165, and the drain electrode 166 may be formed of Al, Cu, Ag, Mo, Cr, Ti, Ta, or an alloy thereof. The first data line 162, the second data line 163, the source electrode 165, and the drain electrode 166 may have a multilayer structure including a lower film (not illustrated) formed of a refractory metal and a low-resistance upper film (not illustrated) formed on the lower film, but the present disclosure is not limited thereto.

The gate electrode 124, the semiconductor layer 140, the source electrode 165, and the drain electrode 166 may form the TFT 167, which is a switching element.

A passivation layer 171 is disposed on the gate insulating layer 130, the first data line 162, the second data line 163, and the TFT 167. The passivation layer 171 may be formed of an inorganic insulating material and may be disposed to cover the TFT 167. The passivation layer 171 may protect the TFT 167 and may prevent the materials of a color filter layer 172 and a planarization layer 173, which will both be described later, from infiltrating into the first semiconductor pattern 141 and the second semiconductor pattern 142. In some exemplary embodiments, the passivation layer 171 may not be provided.

The color filter layer 172 is disposed on the passivation layer 171. The color filter layer 172 may be formed of a photosensitive organic composition comprising a pigment for realizing a color, and the pigment may include any one of red, green and blue pigments. For example, the color filter layer 172 may include a plurality of color filters. For example, each of the plurality of color filters may display any one of a number of primary colors such as red, green, and blue, but the present disclosure is not limited thereto. That is, in another example, each of the plurality of color filters may display any one of cyan, magenta, yellow, and white colors.

The planarization layer 173 is disposed on the color filter layer 172. The planarization layer 173 may be formed of an insulating material. For example, the planarization layer 173 may be an organic layer formed of an organic material. The planarization layer 173 may planarize any regional height differences that may be formed by elements provided between the planarization layer 173 and the first base substrate 110. In other words, the top surface of the planarization layer 173 may be substantially flat. In some exemplary embodiments, the top of the color filter layer 172 may be planarized, in which case, the planarization layer 173 may not be provided. Also, in some exemplary embodiments, elements that will be described later may be stacked on the color filter layer 172 without planarizing the top of the color filter layer 172.

A contact hole CNT, which exposes part of the TFT 167, particularly, part of the drain electrode 166, in a direction perpendicular to the top surface of the first base substrate 110, may be formed in the passivation layer 171, the color filter layer 172, and the planarization layer 173. The contact hole CNT may be formed to penetrate the passivation layer 171, the color filter layer 172, and the planarization layer 173.

The pixel electrode 180 is disposed on the planarization layer 173. The pixel electrode 180 may be physically connected to the drain electrode 166 via the contact hole CNT and may receive a data voltage from the drain electrode 166.

The pixel electrode 180 may be formed of a transparent conductive material such as indium tin oxide (ITO), indium zinc oxide (IZO), indium tin zinc oxide (ITZO), or Al-doped zinc oxide (AZO).

The pixel electrode 180 may generally be disposed within the active area AA and may include an expanded portion, which overlaps with the contact hole CNT to be connected to the drain electrode 166.

An area in which the pixel electrode 180 is disposed may be divided into a plurality of areas. Particularly, the active area AA may be divided into six areas depending on the shape of the pixel electrode 180. The six areas may be arranged in a matrix of two rows and three columns. Among the six areas, the area in the first row and the second column of the matrix may be defined as a first domain area DM1, the area in the second row and the second column of the matrix may be defined as a second domain area DM2, the area in the first row and the first column of the matrix may be defined as a third domain area DM3, the area in the first row and the third column of the matrix may be defined as a fourth domain area DM4, the area in the second row and the first column of the matrix may be defined as a fifth domain area DM5, and the area in the second row and the third column of the matrix may be defined as a sixth domain area DM6.

The first and second domain areas DM1 and DM2 may be larger than the third, fourth, fifth, and sixth domain areas DM3, DM4, DM5, and DM6. Specifically, the first and second domain areas DM1 and DM2 may be twice larger than the third, fourth, fifth, and sixth domain areas DM3, DM4, DM5, and DM6. The first and second domain areas DM1 and DM2 may have the same area, the third and fourth domain areas DM3 and DM4 may have the same area, and the fifth and sixth domain areas DM5 and DM6 may have the same area.

The structure of the pixel electrode 180 may differ from one domain to another domain of the active area AA, and as a result, the direction in which the liquid crystal molecules LC are tilted may also slightly differ from one domain to another domain of the active area AA.

Specifically, from the viewpoint of FIGS. 1, 3, and 4 (hereinafter, "in a plan view"), the liquid crystal molecules LC may be controlled to be tilted in a lower left direction in the first domain area DM1. Also, in a plan view, the liquid crystal molecules LC may be controlled to be tilted in an upper left direction in the second domain area DM2. Also, in a plan view, the liquid crystal molecules LC may be controlled to be tilted in a lower right direction in the third and fourth domain areas DM3 and DM4. Also, in a plan view, the liquid crystal molecules LC may be controlled to be tilted in an upper right direction in the fifth and sixth domain areas DM5 and DM6.

Accordingly, in a plan view, the area occupied by the liquid crystal molecules LC controlled to be tilted in the lower left direction (i.e., the area of the first domain area DM1), the area occupied by the liquid crystal molecules LC controlled to be tilted in the upper left direction (i.e., the area of the second domain area DM2), the area occupied by the liquid crystal molecules LC controlled to be tilted in the lower right direction (i.e., the combined area of the third and fourth domain areas DM3 and DM4), and the area occupied by the liquid crystal molecules LC controlled to be tilted in the lower right direction (i.e., the combined area of the fifth and sixth domain areas DM5 and DM6) may all be the same.

As a result, the liquid crystal molecules LC are controlled to be tilted in various directions, but the distributions of the liquid crystal molecules LC controlled to be tilted in the various directions may all be the same. Thus, the lateral visibility of the LCD device according to an exemplary embodiment of the present disclosure can be uniformly improved.

The structure of the pixel electrode 180, which is for controlling the liquid crystal molecules LC in each of the first, second, third, fourth, fifth, and sixth domain areas DM1, DM2, DM3, DM4, DM5, and DM6, will hereinafter be described.

The pixel electrode 180 includes a first stem electrode 181, a second stem electrode 182, a third stem electrode 183, branch electrodes 184, an edge electrode 185, and an extension electrode 186.

All the elements of the pixel electrode 180 except for the extension electrode 186 may be disposed inside the active area AA, and only the extension electrode 186 may be disposed outside the active area AA.

The first stem electrode 181 may extend across the active area AA along the first direction D1. The first stem electrode 181 may extend in the first direction D1 to divide the active area AA in two halves. That is, the first stem electrode 181 may divide the active area AA into an area in which the first, third, and fourth domain areas DM1, DM3, and DM4 are disposed and an area in which the second, fifth, and sixth domain areas DM2, DM5, and DM6 are disposed. In other words, the first stem electrode 181 may be disposed along the boundaries between the third and fifth domain areas DM3 and DM5, between the first and second domain areas DM1 and DM2, and between the fourth and sixth domain areas DM4 and DM6.

The second stem electrode 182 may extend across the active area AA along the second direction D2. The second stem electrode 182 may divide the active area AA into an area in which the third and fifth domain areas DM3 and DM5 are disposed and an area in which the first, second, fourth, and sixth domain areas DM1, DM2, DM4, and DM6 are disposed. In other words, the second stem electrode 182 may be disposed along the boundaries between the first and third domain areas DM1 and DM3 and between the second and fifth domain areas DM2 and DM5. That is, the second electrode 182 may extend along the second direction D2 and may intersect the first stem electrode 181 to be divided into two halves by the first stem electrode 181.

The third stem electrode 183 may extend in the second direction D2 along one side of the active area AA. The third stem electrode 183, unlike the first and second stem electrodes 181 and 182, may not extend across the active area AA. The third stem electrode 183 may extend along one of a pair of lateral sides of the active area AA that is relatively distant from the second stem electrode 182. That is, in a plan view, the third stem electrode 183 may be disposed along the right sides of the fourth and sixth domain areas DM4 and DM6. In other words, the third stem electrode 183 may extend along the second direction D2 and may be connected to one end of the first stem electrode 181 to be divided into two halves by the first stem electrode 181. Specifically, the third stem electrode 183 may be connected to one of two ends of the first stem electrode 181 that is relatively distant from the second stem electrode 182.

The branch electrodes 184 may extend from the first, second, and third stem electrodes 181, 182, and 183 in diagonal directions with respect to the first and second directions D1 and D2, i.e., in directions not parallel to the first and second directions D1 and D2. The direction in which the branch electrodes 184 extend may differ from one domain area to another domain area of the active area AA. The branch electrodes 184 may be formed to have a smaller width than the first, second, and third stem electrodes 181, 182, and 183.

Specifically, in a plan view, the branch electrodes 184 may extend from the first and second stem electrodes 181 and 182 in an upper right direction in the first domain area DM1.

In a plan view, the branch electrodes 184 may extend from the first and second stem electrodes 181 and 182 in a lower right direction in the second domain area DM2.

In a plan view, the branch electrodes 184 may extend from the first and second stem electrodes 181 and 182 in an upper left direction in the third domain area DM3.

In a plan view, the branch electrodes 184 may extend from the first and third stem electrodes 181 and 183 in the lower right direction in the fourth domain area DM4.

In a plan view, the branch electrodes 184 may extend from the first and second stem electrodes 181 and 182 in a lower left direction in the fifth domain area DM5.

In a plan view, the branch electrodes 184 may extend from the first and third stem electrodes 181 and 183 in the lower left direction in the sixth domain area DM6.

The branch electrodes 184 may extend in the same direction in both the third and fourth domain areas DM3 and DM4 and may also extend in the same direction in both the fifth and sixth domain areas DM5 and DM6.

A first slit SL1 or a second slit SL2 in which a transparent conductive material is not disposed may be provided between the first, second, and third stem electrodes 181, 182, and 183 and the branch electrodes 184. Due to the presence of the first and second slits SL1 and SL2, patterns are formed on the pixel electrode 180, and the direction in which the liquid crystal molecules LC, which overlap with the pixel electrode 180, are tilted can be controlled in accordance with the shape and the patterns of the pixel electrode 180.

The first slit SL1 may be an opening formed between the branch electrodes 184 disposed in the first domain area DM1 and the branch electrodes 184 disposed in the fourth domain area DM4 and between the branch electrodes 184 disposed in the second domain area DM2 and the branch electrodes 184 disposed in the sixth domain area DM6. Accordingly, the first slit SL1 may be disposed between the second and third stem electrodes 182 and 183. Also, the first slit SL1 may overlap with a region where the branch electrodes 184 extending from the second stem electrode 182 and the branch electrodes 184 extending from the third stem electrodes.

A region between the second stem electrode 182 and the first slit SL1 (i.e., the first and second domain areas DM1 and DM2) may be larger than a region disposed on the outside of the second stem electrode 182 (i.e., the third and fifth domain areas DM3 and DM5) and a region disposed on the outside of the first slit SL1 (i.e., the fourth and sixth domain areas DM4 and DM6).

The second slit SL2 may account for the entire opening formed in the active area AA except for the first slit SL1.

Due to the arrangement of the first, second, and third stem electrodes 181, 182, and 183, the branch electrodes 184, and the first and second slits SL1 and SL2, the direction in which the liquid crystal molecules LC are tilted can be controlled.

Specifically, the liquid crystal molecules LC are controlled to be tilted along the directions in which the first, second, and third stem electrodes 181, 182, and 183 and the branch electrodes 184 are disposed and are controlled to diverge from the first and second slits SL1 and SL2. Multiple branch electrodes 184 are disposed to be parallel to one another and have a smaller width than the first, second, and third stem electrodes 181, 182, and 183. Thus, the liquid crystal molecules LC may be tilted to be parallel to the direction in which the branch electrodes 184 extend in each of the first, second, third, fourth, fifth, and sixth domain areas DM1, DM2, DM3, DM4, DM5, and DM6, and the same may apply to the second slit SL2.

Since the first slit SL1 is disposed along the boundaries between the first and fourth domain areas DM1 and DM4 and between the second and sixth domain areas DM2 and DM6, the liquid crystal molecules LC may be controlled to diverge from the boundaries between the first and fourth domain areas DM1 and DM4 and between the second and sixth domain areas DM2 and DM6.

Accordingly, in the first domain area DM1, the first and second stem electrodes 181 and 182 are disposed along the left side and the lower side of the first domain area DM1, and the branch electrodes 184 extend in the upper right direction. Thus, in the first domain area DM1, the liquid crystal molecules LC may be controlled to be tilted in the lower left direction.

In the second domain area DM2, the first and second stem electrodes 181 and 182 are disposed along the left side and the upper side of the second domain area DM2, and the branch electrodes 184 extend in the lower right direction. Thus, in the second domain area DM2, the liquid crystal molecules LC may be controlled to be tilted in the upper left direction.

In the third domain area DM3, the first and second stem electrodes 181 and 182 are disposed along the right side and the lower side of the third domain area DM3, and the branch electrodes 184 extend in the upper left direction. Thus, in the third domain area DM3, the liquid crystal molecules LC may be controlled to be tilted in the lower right direction.

In the fourth domain area DM4, the first stem electrode 181 is disposed along the lower side of the fourth domain area DM4 and the first slit SL1 is disposed on the left side of the fourth domain area DM4, and the branch electrodes 184 extend in the upper left direction. Thus, in the fourth domain area DM4, the liquid crystal molecules LC may be controlled to be tilted in lower right direction.

In the fifth domain area DM5, the first and second stem electrodes 181 and 182 are disposed along the right side and the upper side of the fifth domain area DM5, and the branch electrodes 184 extend in the lower left direction. Thus, in the fifth domain area DM5, the liquid crystal molecules LC may be controlled to be tilted in the upper right direction.

In the sixth domain area DM6, the first stem electrode 181 is disposed along the upper side of the sixth domain area DM6 and the first slit SL1 is disposed on the left side of the sixth domain area DM6, and the branch electrodes 184 extend in the lower left direction. Thus, in the sixth domain area DM6, the liquid crystal molecules LC may be controlled to be tilted in the upper right direction.

The edge electrode 185 may extend from the first, second, and third stem electrodes 181, 182, and 183 along a side of the active area AA where the third stem electrode 183 is not disposed. Also, the edge electrode 185 may be spaced apart from the branch electrodes 184 so as not to be connected to the branch electrodes 184.

The edge electrode 185 may control the liquid crystal molecules LC to be tilted regularly at the ends of the branch electrodes 184. That is, the edge electrode 185 can minimize texture that may be formed at the ends of the branch electrodes 184.

The extension electrode 186 extends beyond the active area AA and is disposed to overlap with the contact hole CNT. The extension electrode 186 may be physically connected to the drain electrode 166 via the contact hole CNT and may be provided with a data voltage. The data voltage provided to the extension electrode 186 may be transmitted to the first, second, and third stem electrodes 181, 182, and 183, the branch electrodes 184, and the edge electrode 185 of the pixel electrode 180 via the extension electrode 186.

Due to the structure of the pixel electrode 180, the visibility of the LCD device according to an exemplary embodiment of the present disclosure can be improved through the control of the liquid crystal molecules LC in each of the first, second, third, fourth, fifth, and sixth domain areas DM1, DM2, DM3, DM4, DM5, and DM6. Also, due to the arrangement of the first and second data lines 162 and 163, the transmissivity of the LCD device according to an exemplary embodiment of the present disclosure can be improved.

Specifically, the first and second data lines 162 and 163 extend along the second direction D2 and are formed of an opaque metal material. Thus, the first and second data lines 162 and 163 can block the transmission of light. Similarly, the second stem electrode 182 and the first slit SL1 extend along the second direction D2 and may be disposed along the boundaries where the liquid crystal molecules LC collide with one another. Thus, the second stem electrode 182 and the first slit SL1 can also block the transmission of light. However, since the first and second data lines 162 and 163 are arranged to overlap with the second stem electrode 182 and the first slit SL1, an area in which the transmission of light is blocked can be minimized. Accordingly, the transmissivity of the LCD device according to an exemplary embodiment of the present disclosure can be improved.

Obviously, various modifications can be made to the structure of the pixel electrode 180. For example, the positions of the second stem electrode 182 and the first slit SL1 may be changed, and as a result, the direction in which the liquid crystal molecules LC are tilted in each of the first, second, third, fourth, fifth, and sixth domain areas DM1, DM2, DM3, DM4, DM5, and DM6 may be changed. Even in this case, the numbers of liquid crystal molecules LC tilted in the same directions can be uniformly maintained in the first, second, third, fourth, fifth, and sixth domain areas DM1, DM2, DM3, DM4, DM5, and DM6.

A first alignment film (not illustrated) may be additionally disposed on the pixel electrode 180. The first alignment film may control the initial alignment angle of the liquid crystal molecules LC injected into the liquid crystal layer 200.

The second display substrate 300 will hereinafter be described.

The second display substrate 300 may include a second base substrate 310, a light-shielding member 320, an overcoat layer 330, and a common electrode 340.

The second base substrate 310 is disposed to face the first base substrate 110. The second base substrate 310 may be durable enough to withstand external shock. The second base substrate 310 may be a transparent insulating substrate. For example, the second base substrate 310 may be a glass substrate, a quartz substrate, or a transparent resin substrate. The second base substrate 310 may have the shape of a flat plate, or may be curved in a particular direction.

The light-shielding member 320 is disposed on a surface of the second base substrate 310 that faces the first display substrate 100. The light-shielding member 320 may be disposed to overlap with the gate line 122, the first data line 162, the second data line 163, the TFT 167, and the contact hole CNT and may block the transmission of light.

The overcoat layer 330 is disposed on a surface of the light-shielding member 320 that faces the first display substrate 100. The overcoat layer 330 may reduce any height difference formed by the light-shielding member 320. In some exemplary embodiments, the overcoat layer 330 may not be provided.

The common electrode 340 is disposed on a surface of the overcoat layer 330 that faces the first display substrate 100.

The common electrode 340 may be formed of a transparent conductive material such as ITO, IZO, ITZO, or AZO.

The common electrode 340 may be formed on the entire surface of the second base substrate 310 as a plate. A common voltage provided by an external source may be provided to the common electrode 340, and thus, the common electrode 340 may form an electric field in the liquid crystal layer 200 together with the pixel electrode 180.

The common voltage may be provided by the external source, and the level of the common voltage may be uniformly maintained during the operation of the LCD device according to an exemplary embodiment of the present disclosure. Accordingly, an electric field may be formed in the space between the pixel electrode 180 and the common electrode 340, which are disposed to overlap with each other, due to a difference between the data voltage provided to the pixel electrode 180 and the common voltage provided to the common electrode 340. Due to the electric field, the liquid crystal molecules LC may be rotated or tilted.

A second alignment film (not illustrated) may be disposed on a surface of the common electrode 340 that faces the first display substrate 100. The second alignment film, like the first alignment film, may control the initial alignment angle of the liquid crystal molecules LC injected into the liquid crystal layer 200.

The liquid crystal layer 200 will hereinafter be described.

The liquid crystal layer 200 includes the liquid crystal molecules LC, which have dielectric anisotropy and refractive anisotropy. The liquid crystal molecules LC may be aligned in a vertical direction with respect to the first and second display substrates 100 and 300 in the absence of an electric field in the liquid crystal layer 200. In response to an electric field being formed between the first and second display substrates 100 and 300, the liquid crystal molecules LC may be rotated or tilted in a particular direction between the first and second display substrates 100 and 300, thereby changing the polarization of light.

Figure 5:
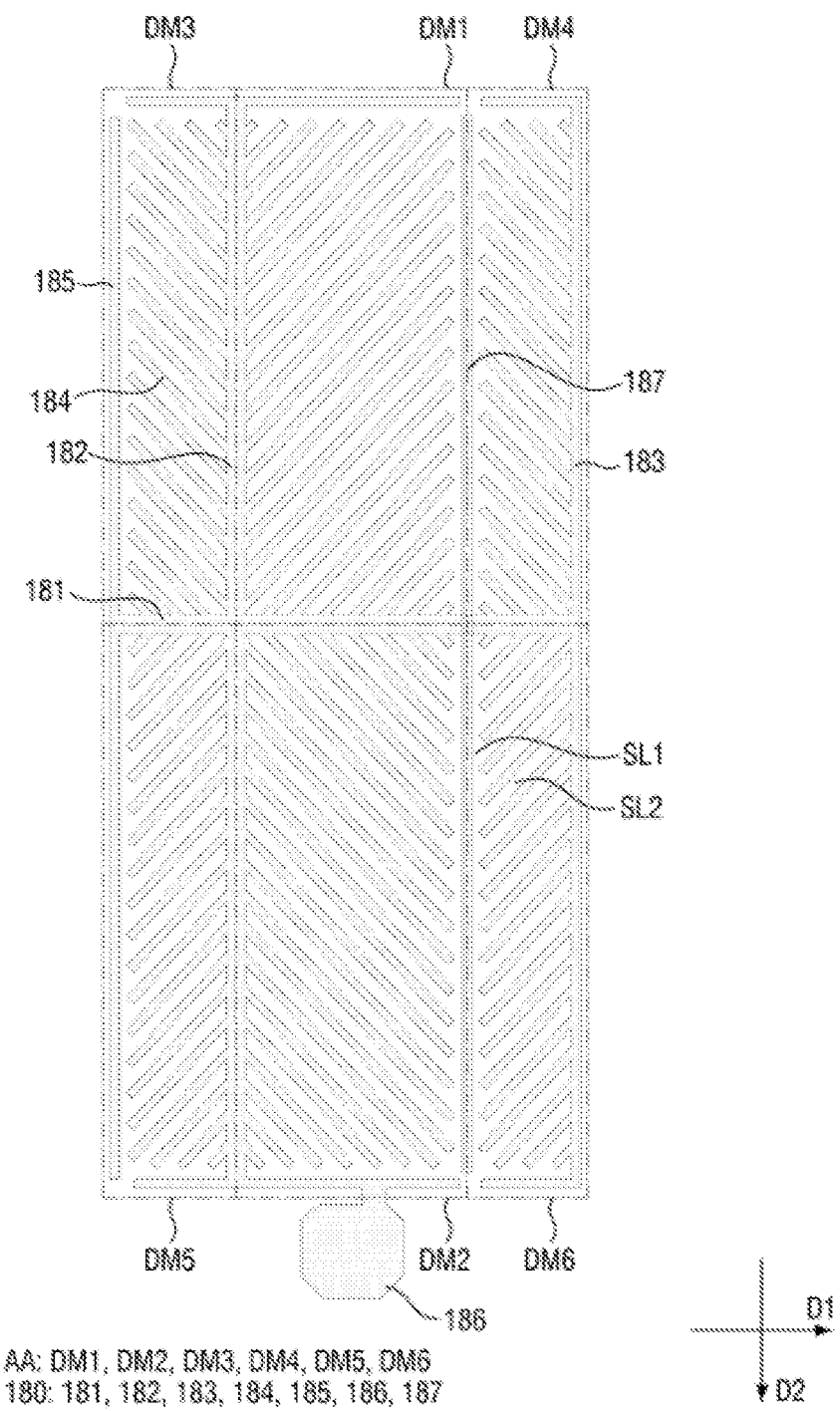
FIG. 5 is a layout view of a pixel electrode of a pixel of an LCD device according to another exemplary embodiment of the present disclosure.

FIG. 5 is a layout view of a pixel electrode of a pixel of an LCD device according to another exemplary embodiment of the present disclosure.

Descriptions of elements and reference numerals that have already been described above with reference to FIGS. 1 through 4 will be omitted, and the exemplary embodiment of FIG. 5 will hereinafter be described, focusing mainly on differences with the exemplary embodiment of FIGS. 1 through 4.

Referring to FIG. 5, a pixel electrode 180 includes a first stem electrode 181, a second stem electrode 182, a third stem electrode 183, branch electrodes 184, an edge electrode 185, an extension electrode 186, an auxiliary electrode 187. The pixel electrode 180 of FIG. 5 differs from the pixel electrode 180 of FIGS. 1 through 4 in that it further includes the auxiliary electrode 187.

The auxiliary electrode 187 may extend along a second direction D2 and may be disposed to overlap with a first slit SL1. The auxiliary electrode 187 may control liquid crystal molecules LC to be tilted regularly so as to minimize the size of texture that may be formed due to the liquid crystal molecules LC diverging at the first slit SL1. Accordingly, the transmissivity of the LCD device according to another exemplary embodiment of the present disclosure can be improved.

Figure 6:
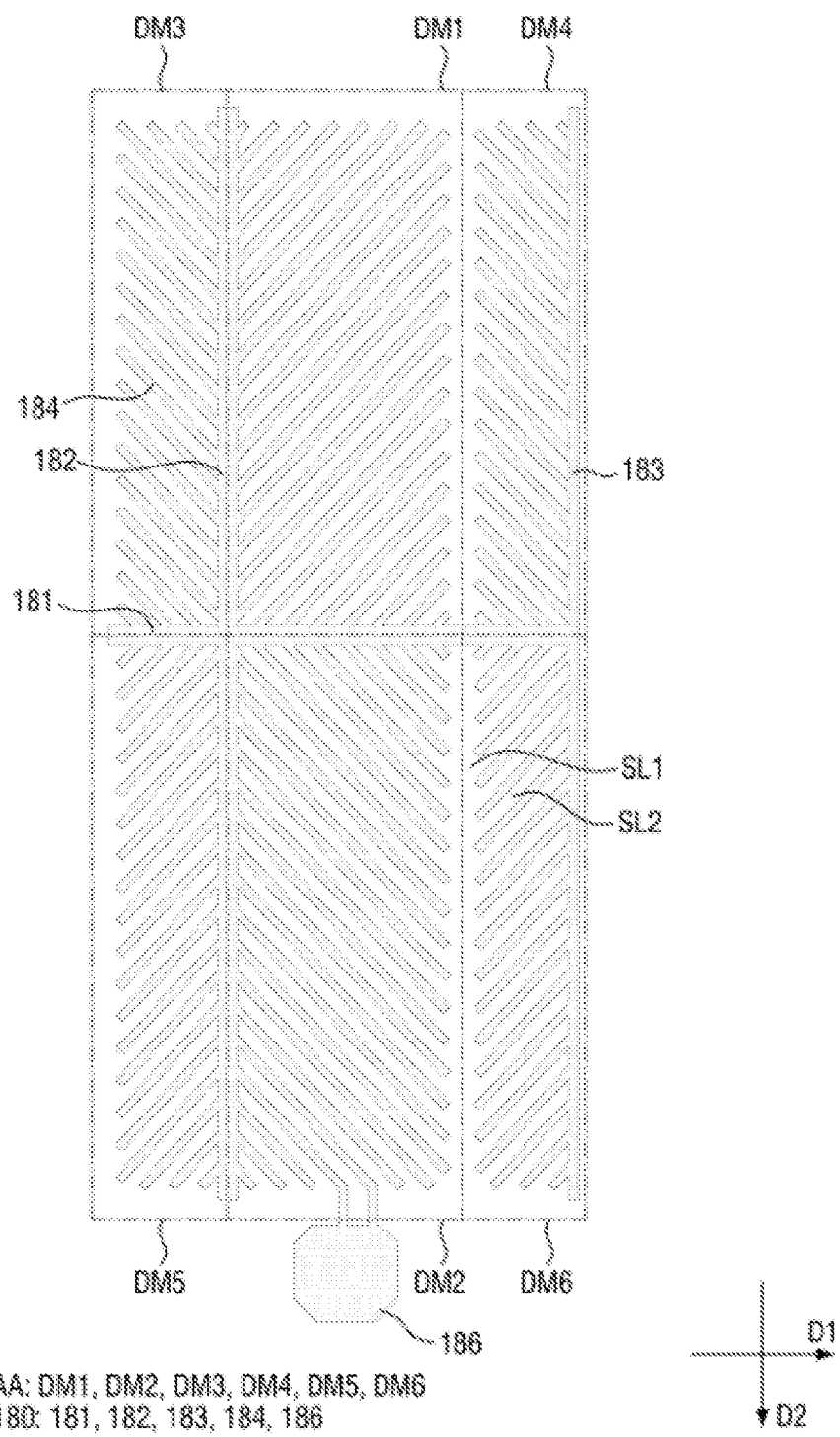
FIG. 6 is a layout view of a pixel electrode of a pixel of an LCD device according to another exemplary embodiment of the present disclosure.

FIG. 6 is a layout view of a pixel electrode of a pixel of an LCD device according to another exemplary embodiment of the present disclosure.

Referring to FIG. 6, a pixel electrode 180 includes a first stem electrode 181, a second stem electrode 182, a third stem electrode 183, branch electrodes 184, and an extension electrode 186. The pixel electrode 180 of FIG. 6 differs from the pixel electrode 180 of FIGS. 1 through 4 in that it does not include the edge electrode 185 of FIG. 3.

Figure 7:
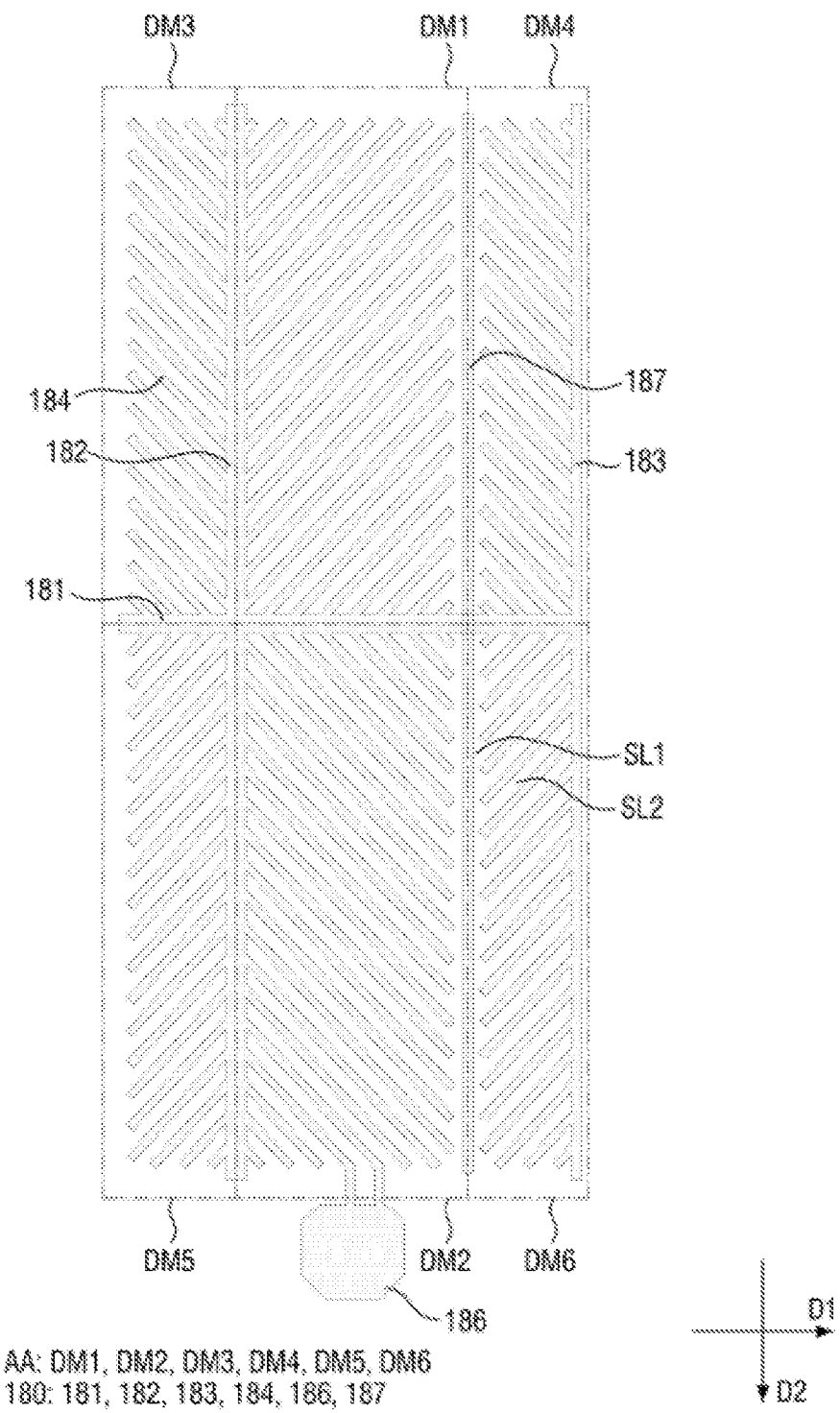
FIG. 7 is a layout view of a pixel electrode of a pixel of an LCD device according to another exemplary embodiment of the present disclosure.

FIG. 7 is a layout view of a pixel electrode of a pixel of an LCD device according to another exemplary embodiment of the present disclosure.

Referring to FIG. 7, a pixel electrode 180 includes a first stem electrode 181, a second stem electrode 182, a third stem electrode 183, branch electrodes 184, an extension electrode 186, and an auxiliary electrode 187. The pixel electrode 180 of FIG. 7 differs from the pixel electrode 180 of FIG. 6 in that it includes the auxiliary electrode 187, but not the edge electrode 185 of FIG. 3.

Figure 8:
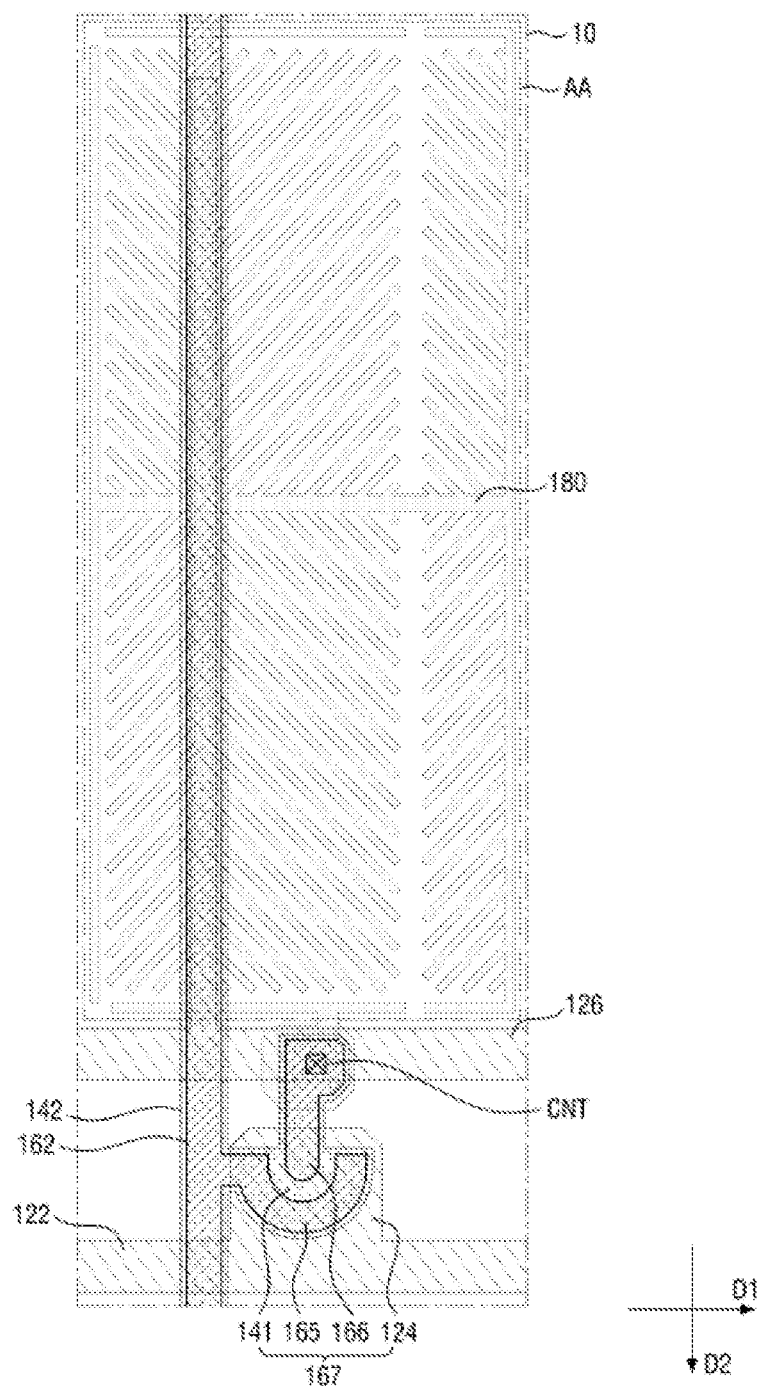
FIG. 8 is a layout view of a pixel of an LCD device according to another exemplary embodiment of the present disclosure.

FIG. 8 is a layout view of a pixel of an LCD device according to another exemplary embodiment of the present disclosure.

Referring to FIG. 8, a pixel 10 includes a first data line 162. The pixel 10 of FIG. 8 differs from the pixel 10 of FIGS. 1 through 4 in that it does not include the second data line 163 of FIG. 1. That is, the pixel 10 of FIG. 8 includes only one conductive line for providing a data voltage.

Figure 9:
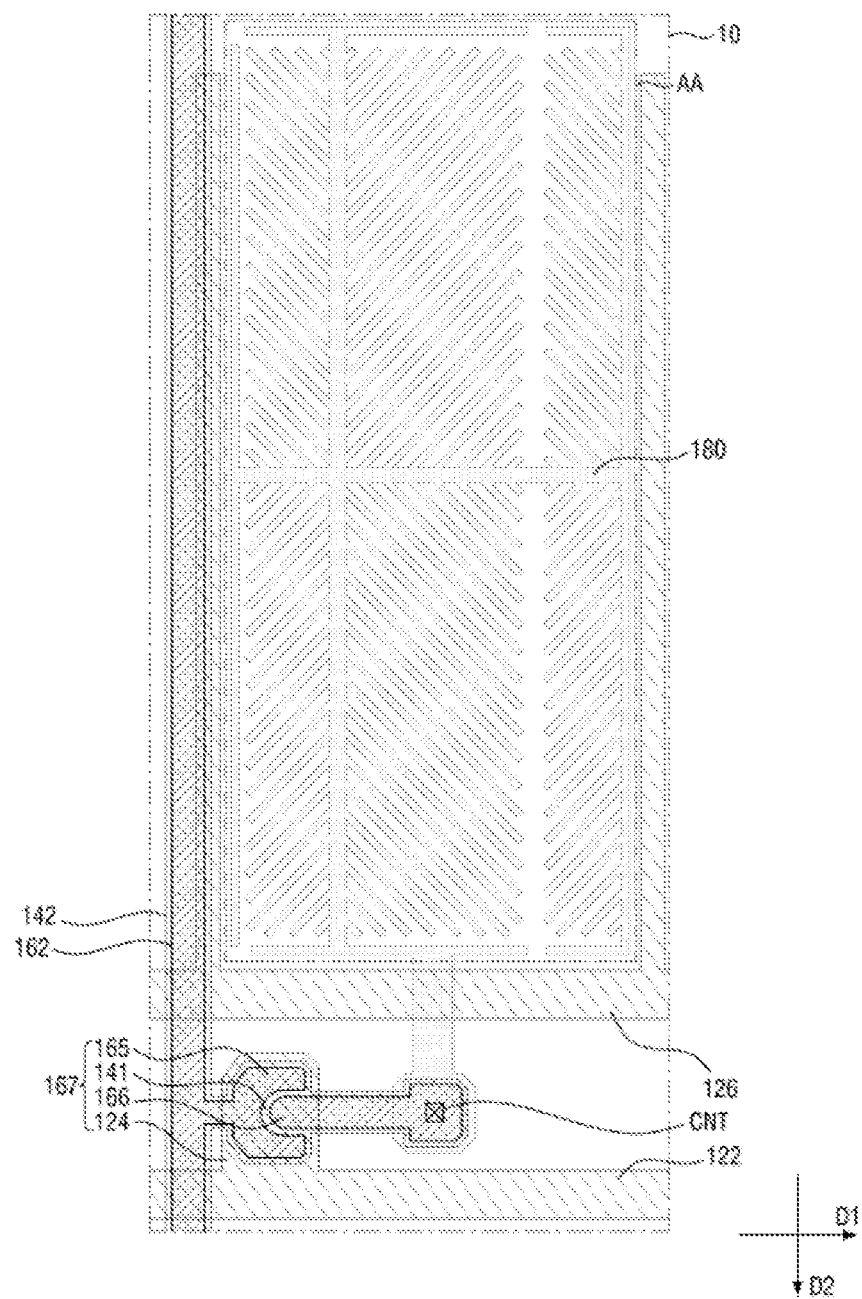
FIG. 9 is a layout view of a pixel of an LCD device according to another exemplary embodiment of the present disclosure.

FIG. 9 is a layout view of a pixel of an LCD device according to another exemplary embodiment of the present disclosure.

Referring to FIG. 9, a pixel 10 includes a first data line 162, but does not include the second data line 163 of FIG. 1. The pixel 10 of FIG. 9 differs from the pixel 10 of FIGS. 1 through 4 in that it does not include the second data line 163 of FIG. 1. The pixel 10 of FIG. 9 also differs from the pixel 10 of FIGS. 1 through 4 in that the first data line 162 is disposed outside an active area AA and does not overlap with a pixel electrode 180.

Figure 10:
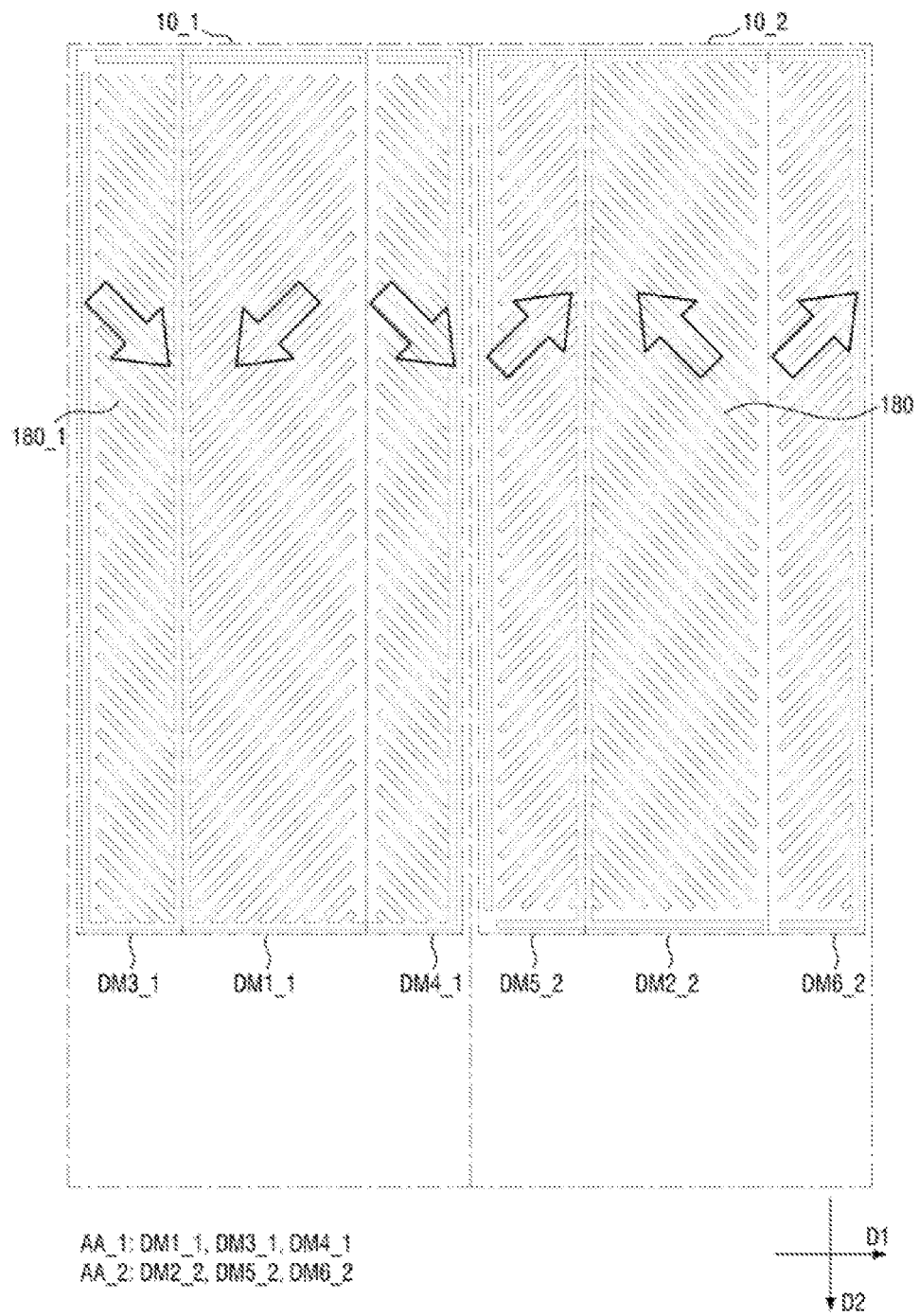
FIG. 10 is a layout view of two adjacent pixel electrodes included in an LCD device according to another exemplary embodiment of the present disclosure.

FIG. 10 is a layout view of two adjacent pixel electrodes included in an LCD device according to another exemplary embodiment of the present disclosure.

FIG. 10 illustrates two arbitrary pixels disposed side-by-side in a first direction D1, i.e., first and second pixels 10_1 and 10_2. The first pixel 10_1 includes a first pixel electrode 180_1, and the second pixel 10_2 includes a second pixel electrode 180_2. The structure of the first and second pixels 10_1 and 10_2 may be substantially the same as the structure of the pixel 10 of FIGS. 1 through 4.

Referring to FIG. 10, the first pixel 10_1 includes a first active area AA_1, and the second pixel 10_2 includes a second active area AA_2.

The first active area AA_1 includes first, third, and fourth domain areas DM1_1, DM3_1, and DM4_1. The second active area AA_2 includes second, fifth, and sixth domain areas DM2_2, DM5_2, and DM6_2. Liquid crystal molecules LC may be controlled to be tilted in the same directions in the first, second, third, fourth, fifth, and sixth domain areas DM1_1, DM2_2, DM3_1, DM4_1, DM5_2, and DM6_2 as in the first, second, third, fourth, fifth, and sixth domain areas DM1, DM2, DM3, DM4, DM5, and DM6 of FIGS. 1 through 4.

That is, by using the first and second pixels 10_1 and 10_2, which are adjacent to each other, the direction in which the liquid crystal molecules LC are tilted in each of the first, second, third, fourth, fifth, and sixth domain areas DM1_1, DM2_2, DM3_1, DM4_1, DM5_2, and DM6_2 can be controlled to be uniform, and as a result, the visibility of the LCD device according to another exemplary embodiment of the present disclosure can be improved. In the first and second pixels 10_1 and 10_2, unlike in the pixel 10 of FIGS. 1 through 4, the first stem electrode 181 is not provided, and as a result, the transmissivity of the LCD device according to another exemplary embodiment of the present disclosure can be further improved.

What is claimed is:

1. A liquid crystal display (LCD) device comprising:
a substrate on which an active area that transmits light therethrough is defined;
a gate line disposed on the substrate and extending along a first direction;
a first data line disposed on the substrate, insulated from the gate line and extending along a second direction that is perpendicular to the first direction;
a thin film transistor electrically connected to the gate line and the first data line;
a pixel electrode disposed on the substrate and electrically connected to the thin film transistor,
wherein the pixel electrode includes a first stem electrode, which extends along the first direction, a second stem electrode, which extends along the second direction and intersects the first stem electrode to be divided into two halves by the first stem electrode, a third stem electrode, which extends along the second direction and is connected to the first stem electrode to be divided into two halves by an end of the first stem electrode, and a plurality of branch electrodes, which extend from the first through third stem electrodes and each branch electrode is not parallel nor perpendicular to the first through third stem electrodes; and
a first slit disposed on a same layer as the pixel electrode and extending between the second and third stem electrodes along the second direction,
wherein the first and second stem electrodes and the first slit divide the active area into six domain areas in each of which liquid crystal molecules are tilted in a same direction,
wherein the area of the domain areas disposed between the second stem electrode and the first slit are larger than the area of the domain areas disposed on an outside of the second stem electrode and the area of the domain areas disposed between the first slit and the third stem electrode,
wherein the first data line overlaps with the second stem electrode, and
wherein any slit extending along the second direction is not disposed between the first slit and the second stem electrode.

2. The LCD device of claim 1, wherein the first stem electrode is disposed in the active area and divides the active area into two halves along the first direction.

3. The LCD device of claim 2, wherein the third stem electrode is connected to one of two ends of the first stem electrode that is distant from the second stem electrode.

4. The LCD device of claim 1, wherein the active area includes first and second domain areas, which are disposed between the second stem electrode and the first slit and are separated by the first stem electrode, third and fifth domain areas, which are disposed on the outside of the second stem electrode and are separated by the first stem electrode, and fourth and sixth domain areas, which are disposed on the outside of the first slit and are separated by the first stem electrode.

5. The LCD device of claim 4, wherein the area of the first domain area, the area of the second domain area, the combined area of the third and fourth domain areas, and the combined area of the fifth and sixth domain areas are all the same.

6. The LCD device of claim 4, further comprising:
liquid crystal molecules disposed on the pixel electrode,
wherein the liquid crystal molecules are tilted in the same direction in both the third and fourth domain areas and are tilted in the same direction in both the fifth and sixth domain areas.

7. The LCD device of claim 1, wherein the first slit overlaps with a region in which branch electrodes extending from the second stem electrode and branch electrodes extending from the third stem electrode.

8. The LCD device of claim 1, further comprising:
a second slit disposed between the branch electrodes.

9. The LCD device of claim 1, further comprising:
a second data line disposed on the substrate, extending along the second direction, and spaced apart from the first data line,
wherein the second data line overlaps with the first slit.

10. An LCD device comprising:
a substrate on which an active area that transmits light therethrough is defined;
a gate line disposed on the substrate and extending along a row direction;
a first data line disposed on the substrate, insulated from the gate line and extending along a column direction;
a thin film transistor electrically connected to the gate line and the first data line;
a pixel electrode disposed on the substrate and electrically connected to the thin film transistor,
wherein
the active area is divided into six domain areas in each of which liquid crystal molecules are tilted in a same direction, and the active area includes a first domain area disposed in a first row and a second column, a second domain area disposed in a second row and the second column, a third domain area disposed in the first row and a first column, a fourth domain area disposed in the first row and a third column, a fifth domain area disposed in the second row and the first column, and a sixth domain area disposed in the second row and the third column, and the pixel electrode includes a first stem electrode, which is disposed along boundaries between the first and second domain areas, between the third and fifth domain areas, and between the fourth and sixth domain areas, a second stem electrode, which is disposed along boundaries between the first and third domain areas and between the second and fifth domain areas, a third stem electrode, which is disposed along lateral sides of the fourth and sixth domain areas that are distant from the second stem electrode, and a plurality of branch electrodes, which extend from the first through third stem electrodes and each branch electrode is not parallel nor perpendicular to the first through third stem electrodes; and a first slit disposed along the boundaries between the first and fourth domain areas and between the second and sixth domain areas, the first slit extended along the column direction, wherein the area of the domain areas disposed between the second stem electrode and the first slit are larger than the area of the domain areas disposed on an outside of the second stem electrode and the area of the domain areas disposed between the first slit and the third stem electrode, wherein the first data line overlaps with the second stem electrode, and wherein any slit extending along the column direction is not disposed between the first slit and the second stem electrode.

11. The LCD device of claim 10, further comprising:
a plurality of slits disposed between the branch electrodes.

12. The LCD device of claim 10, further comprising:
a second data line disposed on the substrate, extending along the column direction and overlapping with the first slit.

13. The LCD device of claim 10, wherein the area of the first domain area, the area of the second domain area, the combined area of the third and fourth domain areas, and the combined area of the fifth and sixth domain areas are all the same.

14. The LCD device of claim 10, further comprising:
liquid crystal molecules disposed on the pixel electrode, wherein the liquid crystal molecules are tilted in the same direction in both the third and fourth domain areas and are tilted in the same direction in both the fifth and sixth domain areas.

* * * * *